United States Patent [19]

Thelen

[11] 4,020,582

[45] May 3, 1977

[54] JIG FISHING APPARATUS

[76] Inventor: Rodney G. Thelen, Rte. 1, St. Cloud, Minn. 56301

[22] Filed: July 29, 1976

[21] Appl. No.: 709,638

Related U.S. Application Data

[63] Continuation-in-part of Ser. No. 583,590, June 4, 1975, abandoned.

[52] U.S. Cl. .............................................. 43/19.2
[51] Int. Cl.² ...................................... A01K 87/00
[58] Field of Search ................................... 43/19.2

[56] References Cited

UNITED STATES PATENTS

| | | | |
|---|---|---|---|
| 2,746,198 | 5/1956 | Smith | 43/19.2 |
| 2,882,638 | 4/1959 | Moore | 43/19.2 |
| 2,992,504 | 7/1961 | Cape | 43/19.2 |
| 3,499,241 | 3/1970 | Ruppa | 43/19.2 |

FOREIGN PATENTS OR APPLICATIONS

| | | | |
|---|---|---|---|
| 167,399 | 1/1965 | U.S.S.R. | 43/19.2 |
| 246,956 | 11/1969 | U.S.S.R. | 43/19.2 |

*Primary Examiner*—Warner H. Camp

[57] ABSTRACT

A fishing rod apparatus including a rod pivotally attached to a handle. Battery powered oscillating apparatus contained within the handle, controlled by a thumb switch on the fishing rod handle, imparts an oscillating motion to the rod about the pivot point of attachment. The oscillating apparatus includes an electromagnet which, in combination with a magnet attached to the base of the rod, attracts and repels the rod as power is supplied to the electromagnet. When the thumb switch is closed, power is supplied to the electromagnet through an impulse circuit breaker connected in series with the electromagnet. The circuit breaker is opened and closed by the oscillating movement of the rod to establish an intermittent supply of power to the electromagnet to continuously oscillate the rod for purposes of jig fishing. In an alternative embodiment, a solid-state electronic pulsing unit of a predetermined pulse rate controls the power to the electromagnet.

6 Claims, 12 Drawing Figures

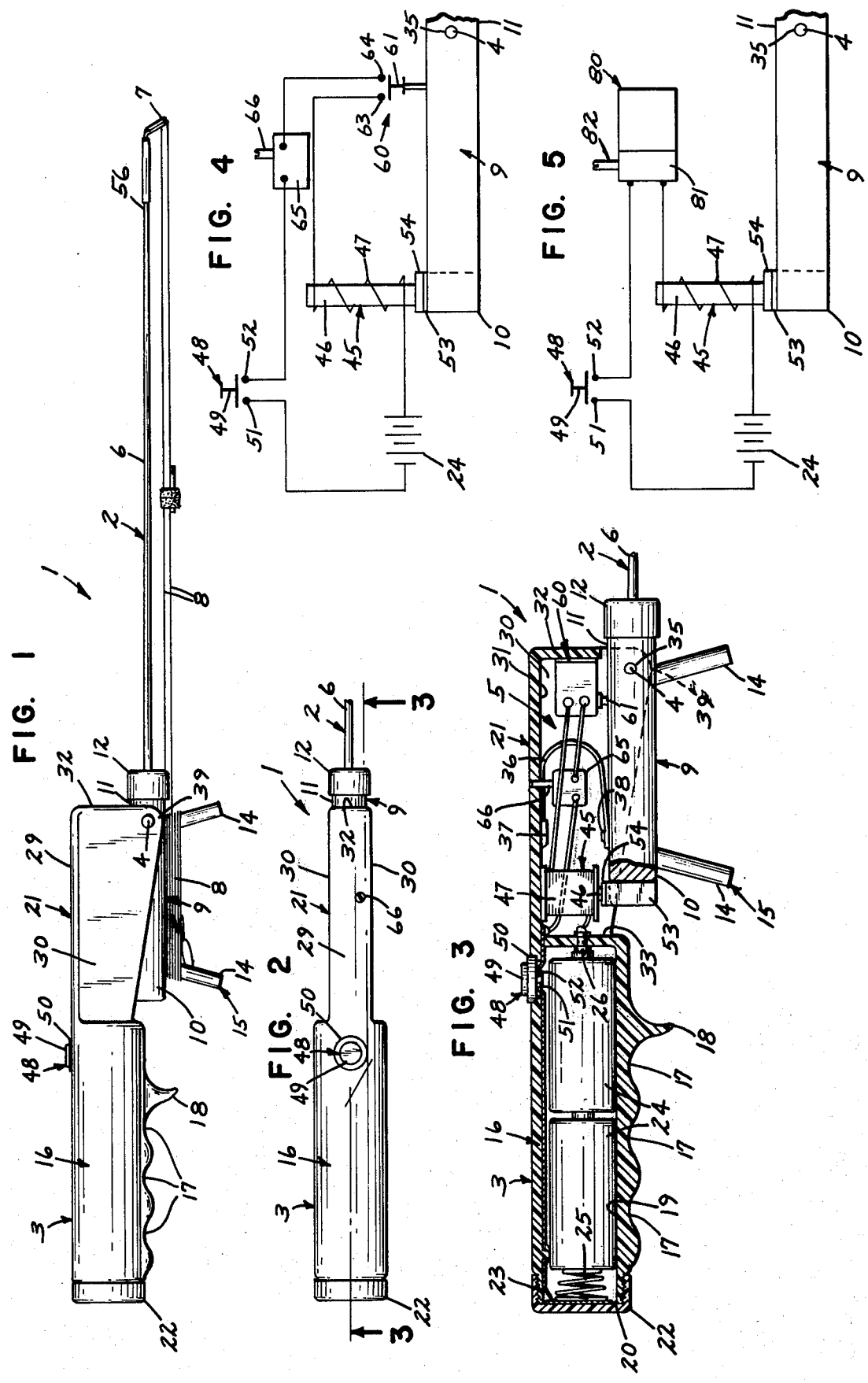

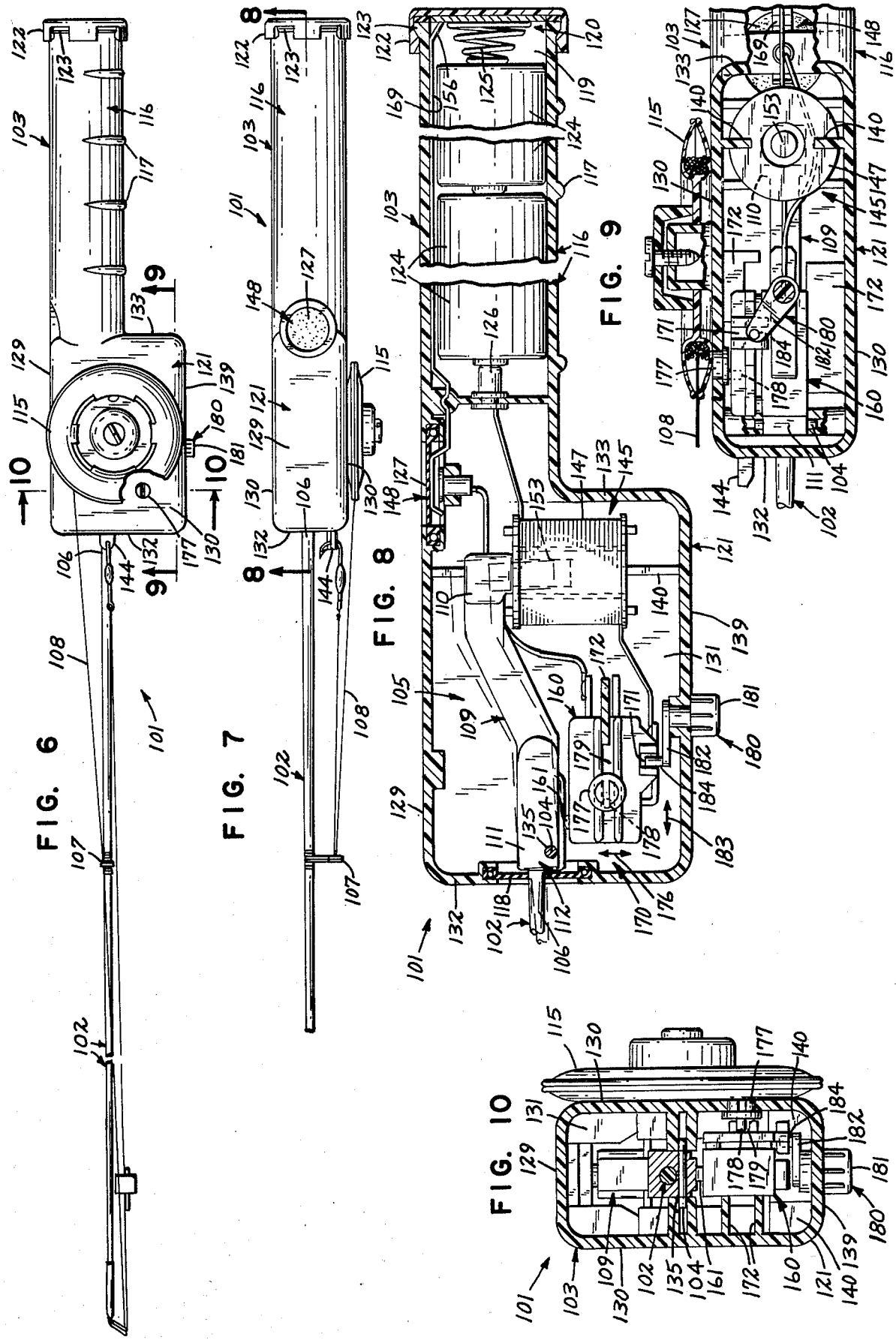

JIG FISHING APPARATUS

CONTINUATION-IN-PART APPLICATION

The present application is a continuation-in-part of a now abandoned, co-pending application filed on June 4, 1975, and assigned Ser. No. 583,590.

BACKGROUND OF THE INVENTION

1. Field of the Invention

Fishing pole apparatus having an electrical drive mechanism for imparting an oscillating motion to the fishing rod.

2. Description of the Prior Art

Various pole and line devices have long been utilized for the catching of fish. Such devices include simple poles, poles in combination with reels and other devices which allow a fishing line to be selectively extended into and withdrawn from the water.

In addition to the simple function of extending a line into the water and withdrawing it for purposes of "reeling in" the catch, the well-trained sport fisherman has long utilized various techniques for moving his fishing rod up and down in short strokes in an effort to manipulate the bait at the end of the line in such a way that it would attract a feeding fish. This practice is known as "jigging." The jigging action of the line is generally accomplished by repeated, short quick motions of the rod end. This results from manipulation of the rod handle using the wrist or forearm. It has also been found that variations in the type of bait utilized and the type of fish being sought requires a different frequency or rapidity of the jigging motion for various types of fishing.

Presently available fishing rod apparatus, while providing various reel devices for extending and withdrawing a fishing line in a rapid and efficient manner, generally does not provide any mechanized apparatus for "jigging" the line. In situations where it is necessary to continue the jigging action of the rod for long periods, the wrist or forearm of the person utilizing the rod may become fatigued thus limiting the ability of the fisherman to jig the fishing line continuously. Also, there may be advantages to jigging the line in a repeated and continuous fashion which may be difficult to achieve by the rather erratic motion of the fisherman's arm or wrist. In addition to the fatigue factor, handicapped persons or persons who otherwise have restricted control of their arm or wrist are not able to utilize the jigging techniques in their sport fishing.

SUMMARY

The present invention consists of jig fishing apparatus which combines an extended rod pivotally connected to a handle. Various provisions may be made for stringing a fishing line along the rod. To mechanically oscillate the rod about its pivot point in such a way that a jigging motion is imparted to the fishing line, an electrical oscillating apparatus is attached to the fishing rod handle. Batteries contained within the handle or other suitable power means are utilized for powering the oscillating apparatus. Included in the oscillating apparatus is an electromagnet which is mounted to the fishing rod handle and which contains an armature that is magnetized each time power is supplied to a coil surrounding the armature. Attached to the extended rod adjacent the electromagnet is a permanent magnet. When the armature of the electromagnet is energized, the two magnets repel each other causing the base of the fishing rod to be forced away from the handle. When the power to the electromagnet is discontinued, the metallic armature is no longer magnetized and attracts the permanent magnet to return the rod to its starting position. Thus, the electromagnet serves to alternatively repel and attract the base of the fishing rod as power is supplied to it. This produces a pivoting motion of the rod about the point where it is attached to the handle.

Power from the batteries is routed to the electromagnet through an impulse circuit breaker which is connected in series with the electromagnet. The impulse circuit breaker acts as a switch which is opened and closed by a contact member operably connected to the base of the rod. A push button switch attached to the handle controls the flow of power from the batteries to the electromagnet and circuit breaker. Thus, once the thumb switch is turned on, power is transmitted intermittently to the electromagnet through the impulse switch. When the electromagnet first repels the rod portion, this motion opens the impulse circuit breaker which is normally closed. This opening of the circuit cuts power to the electromagnet which then allows the permanent magnet to be attracted to the armature. This attraction moves the base of the rod toward the electromagnet which triggers the circuit breaker and closes the circuit to the electromagnet. This intermittent powering of the electromagnet causes the base of the fishing rod to oscillate about its pivot point causing the free end of the fishing rod to also oscillate in a manner which produces a jigging of the fishing line.

In an alternative embodiment, an electronic pulsing unit electronically, rather than mechanically interrupts the flow of power to the electromagnet. This serves to energize and de-energize electronically the electromagnet to oscillate the fishing rod.

In a second embodiment of this invention, alternative mounting means for a balance arm device are provided which allow the extended rod to be oscillated. In this second embodiment, circuit breaker mounting means are provided for the selective positioning of the impulse circuit breaker to regulate the amplitude of oscillation of the rod. This allows for the selection of one of numerous amplitudes of oscillation for the rod.

DESCRIPTION OF THE DRAWINGS

FIG. 1 is a side plan view showing the fishing rod apparatus;

FIG. 2 is a top plan view of the fishing rod handle;

FIG. 3 is a detailed cross-sectional view of the fishing rod handle shown in FIG. 2 taken along the line 3—3;

FIG. 4 is a schematic circuit diagram of the oscillating apparatus utilized in the fishing rod of FIG. 1;

FIG. 5 is a schematic diagram of the oscillating apparatus of an alternative embodiment.

FIG. 6 is a side plan view showing a primary alternative embodiment of the fishing rod apparatus;

FIG. 7 is a top plan view of the primary alternative embodiment fishing rod apparatus;

FIG. 8 is a detailed cross-sectional view of the handle of the primary alternative embodiment shown in FIG. 7 taken along the line 8—8.

FIG. 9 is a detailed cross-sectional view of a portion of the handle of the primary alternative embodiment apparatus shown in FIG. 6 taken along the line 9—9;

FIG. 10 is a detailed cross-sectional front view of the primary alternative embodiment apparatus shown in FIG. 6 taken along the line 10—10;

DETAILED DESCRIPTION OF THE PREFERRED EMBODIMENT DESCRIPTION OF FIRST EMBODIMENT

Figure 12:
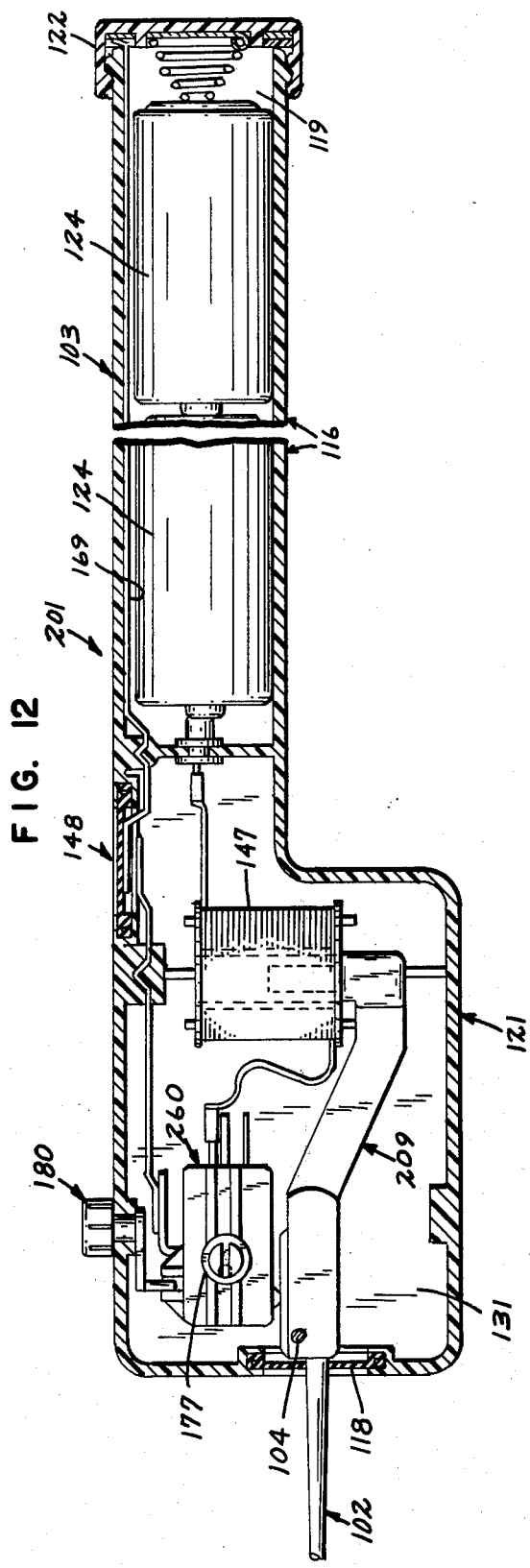
FIG. 12 is a detailed cross-sectional view of the handle of fishing rod apparatus which represents an alternative embodiment of the primary alternative embodiment as to the placement of elements in the oscillating apparatus.

Referring to FIGS. 1–4, wherein like numerals refer to like structural elements, the fishing rod 1 consists generally of an extended rod portion 2 which is attached to a handle 3 by means of a pivot pin 4. Oscillating apparatus 5, which will be described in detail later, operably interconnects rod 2 with handle 3 to provide an oscillating motion of rod 2 with respect to handle 3 which serves to jig a fishing line 8 which may be attached to rod 2.

As is shown in FIGS. 1–3, the extended rod portion 2 consists of an elongated pole 6 which is attached to a base member 9 and which has a free end 56. Elongated pole 6 may carry various numbers of line-guiding eyelets 7 through which a fishing line can be strung. Although elongated pole 6 is shown as a straight element, it may also be curved and have various lengths (not shown). Elongated pole 6 is attached to base member 9 by means of an attachment device 12 which threadably attaches to the attachment end 11 of base member 9. Threaded attachment device 12 allows elongated pole 6 to be removed from base member 9 for purposes of storage. However, other means of attaching elongated pole 6 to base member 9 may also be utilized where appropriate. In the preferred embodiment shown in the FIGS., a line storage rack 15 is provided by means of opposed dowels, each designated by the numeral 14, which protrude from rod base member 9. Other means for attaching line 8 to rod portion 2 may also be utilized, including the use of a spinning reel or other type of reel (not shown). Attachment end 11 of base member 9 contains a hole 35 through which extends pivot pin 4 to provide a pivot point of connection between elongated rod 2 and handle 3. The function of this pivot mounting method will be described in detail later. Opposite attachment end 11 of base member 9 is a drive end 10 to which is attached a permanent magnet 53 located generally along the top edge of base member 9. The function of permanent magnet 53 will be described in detail later.

Handle 3 consists of an elongated body portion 16 attached to a mounting portion 21. Elongated body 16 has a contoured bottom surface with finger indentations 17 and a finger grip 18. Handle 3 is generally held by wrapping the hand around elongated body 16. Contained within elongated body 16 is a recess 19 which, in the preferred embodiment, houses two power cells each designated by the numeral 24 (see FIG. 3). In the preferred embodiment, a 6 to 9 volt power supply is used. Handle recess 19 is accessable through an opening 20 in the back end of elongated body 16. A retention cap 22 threadably attaches to threads 23 formed adjacent the back edge of elongated body 16. An engagement spring 25 attached to the interior surface of retention cap 22 acts to force the two power cells 24 into engagement with one another to provide two electrical cells in series. Other arrangements for power devices may also be utilized and power cells may be located in other portions of fishing rod 1 where appropriate. In addition, other forms for elongated body 16 may be used to provide handle means for the fishing rod 1.

As is shown in FIGS. 2 and 3, mounting portion 21 of handle 3 comprises a top member 29 which is attached to opposed side members 30. A front bulk head 32 and an opened rear bulk head 33 adjoin the ends of side members 30 to form an enclosed elongated compartment 31 within mounting portion 21. In the preferred embodiment, each of side members 30 has a bottom portion 39 which extends downwardly below and toward front bulk head 32. A pivot pin 4 is mounted between each of side member bottom portions 39. Pivot pin 4 is intended to extend through pin hole 35 in the attachment end 11 of base member 9. Thus, pivot pin 4 serves as the pivotal mounting point about which the extended rod 2 oscillates. Other movable means for connecting extended rod 2 to handle 3 may also be utilized. In certain instances a non-pivoting type of movable connection between extended rod 2 and handle 3, e.g. a purely lateral movable connection, may also be utilized (not shown) as a means for movably mounting extended rod 2 to handle 3. A contact post 26 attached to rear bulk head 33 provides an electrical contact with the positive terminal of the forwardly located one of the power cells 24.

Housed within compartment 31 of handle 3 is oscillating apparatus which is described generally by the numeral 5. Oscillating apparatus 5 includes a magnetic drive device 45 and an impulse circuit breaker 60. As is shown in detail in FIG. 3 and in the electrical schematic of FIG. 4, magnetic drive device 45 consists of a metallic armature 46 which is surrounded by an electrical coil 47. The magnetic drive device 45 is attached to top member 29 of handle 3. When coil 47 is energized by a current flow, metallic armature 46 is magnetized. When the power supply to coil 47 is terminated, metallic 46 becomes demagnetized. Metallic armature 46 has one end positioned generally adjacent to permanent magnet 53 which is attached to the top portion of base member 9 of extended rod 2. In addition, the foam pad 54, which may be constructed of any generally compressable insulating material, is positioned between permanent magnet 53 and the base end of metallic armature 46, for purposes which will be described in detail later.

When coil 47 is energized, armature 46 becomes magnetized with a polarity which is opposite the polarity of permanent magnet 53. This creates a repulsive magnetic force between metallic armature 46 and permanent magnet 53 which forces the drive end 10 of base member 9 away from the metallic armature. When the power supply to coil 47 is terminated and armature 46 is demagnetized, there is a magnetic attraction between permanent magnet 53 and metallic armature 46 which tends to draw the drive end 10 of base member 9 toward the metallic armature. This attraction and repulsion between metallic armature 46 and permanent magnet 53 acts to pivot base member 9 about pivot pin 4. This in turn causes an oscillating movement to the forward end of extended rod 2. This motion of extended rod 2 causes a jigging motion in a fishing line 8 which may be carried by extended rod 2.

To cause the drive end 10 of base member 9 to be cyclically moved away and toward metallic armature 46 in such a way as to cause a continuously oscillating movement of base member 9, it is necessary that the power supply to coil 47 be intermittently turned on and off. To cause the supply of power to coil 47 from power cells 24 to be intermittent, the impulse circuit breaker 60 is utilized. As is shown in detail in FIGS. 3 and 4, impulse circuit breaker 60 is attached to front bulk head 32 of handle 3. Impulse circuit breaker 60 consists of a movable switching element 61 which is positioned adjacent to fixed terminals 63 and 64. As is typical in the art of circuit breakers, as switching element 61 makes contact between terminals 63 and 64, the circuit between the terminals is closed; when switching element 61 moves away from the terminals the circuit is opened. In the preferred embodiment, impulse circuit breaker 60 is in a normally closed position. Connected in series with impulse circuit breaker 60 is a thumb switch 48. As is shown in FIG. 3, thumb switch 48 is attached to the top portion of handle 3 in a position wherein the operator of the fishing rod 1 can activate switch 48 by motion of his thumb or finger. In the preferred embodiment, thumb switch 48 consists of a switch housing 50 which is attached to handle 3 and which contains a push button 49. Other suitable switches may also be utilized where appropriate.

As is shown schematically in FIG. 4, thumb switch 48, power cells 24, impulse circuit breaker 60 and magnetic drive device 45 are all connected in series. The purpose of such series connection can be described as follows. When thumb switch 48 is closed by the person utilizing the rod, power from power cells 24 is conducted across the terminals (51 and 52) of thumb switch 48 to impulse circuit breaker 60. Since impulse circuit breaker 60 is normally closed, the power is transmitted to coil 47 of drive device 45. A flow of current in coil 47 magnetizes metallic armature 46 which has a polarity opposed to the polarity of permanent magnet 53. Thus, the two magnets repel one another forcing the drive end 10 of base member 9 downwardly away from handle 3. Because extended rod 2 is pivoted about pivot pin 4, the free end of elongated pole 6 moves in an upward direction. In order to establish this first complete circuit which energizes coil 47 when thumb switch 48 is closed, impulse circuit breaker 60 is maintained in its normally open position. This is achieved by the exertion of pressure on switching element 61 by the front end portion 11 of base member 9. Switching element 61 is kept in its closed position when the base member 9 is "at rest". This at rest position is maintained by means of a biasing spring 36 which is operably connected between base member 9 and top member 29 of handle 3. As is shown in FIG. 3, biasing spring 36 is U-shaped with one end attached to base member 9 by means of a screw 38 and the opposite end attached to top member 29 by means of a spring attachment pedestal 37. In this position, biasing spring 36 tends to hold base member 9 in the at rest position shown in FIG. 3. In this at rest position, switching element 61 is forced into contact between terminals 63 and 64 of impulse circuit breaker 60 which is the closed position for the circuit breaker. In this at rest position, compressable non-conducting pad 54 forms a space between permanent magnet 53 and metallic armature 46. The purpose of pad 54 is to electrically isolate permanent magnet 53 from metallic armature 46. If this insulator were not present, when metallic armature 46 were magnetized by energization of coil 47, permanent magnet 54 would form a part of the circuit and opposed polarities of the two magnets would not be established. Consequently, a repelling force would not be established. In addition, the thickness and material of pad 54 is such that when metallic armature 46 is not magnetized, the strength of permanent magnet 53 is sufficient to form an attraction between metallic armature 46 and permanent magnet 53 despite the presence of pad 54. Other detailed embodiments of magnetic repelling and attracting devices may also be utilized where appropriate.

After metallic armature 46 has been magnetized by the closing of thumb switch 48, base member 9 is forced downwardly by the magnetic repulsion between metallic armature 46 and permanent magnet 53. When the drive end 10 of base member 9 is in a down position, contact post 62 is withdrawn from switching element 61 which allows switching element 61 to move away from terminals 63 and 64. This movement can be accomplished either by fixed connection between contact 62 and switching element 61 or by biasing means which urge switching element 61 away from terminals 63 and 64. When switching element 61 breaks the contact between terminals 63 and 64 impulse circuit breaker 60 is opened and the flow of current to coil 47 is interrupted. As a result, metallic armature 46 is demagnetized and no longer repels permanent magnet 53. Biasing spring 36 then tends to urge base member 9 back into its at rest position. When base member 9 returns to its at rest position, switching element 61 again moves to its closed position which allows current to again be conducted through coil 47, which magnetizes metallic armature 46. This then again repels permanent magnet 53 and establishes the same cycle over again. This oscillating or intermittent supply of current to coil 47 is continued as long as thumb switch 48 is in its closed position. As a result, base member 9 oscillates upwardly and downwardly about pivot pin 4 with a corresponding upward and downward movement of the end of extended rod 2. This causes a jigging motion of the end of the rod and a similar motion in any line which is attached to the end of the rod. Such jigging motion is advantageous for fishing purpose in that it manipulates the lure or bait to attract fish.

In the preferred embodiment, a time delay mechanism 65 is utilized in conjunction with impulse circuit breaker 60. Time delay mechanism 65 delays the closing of circuit breaker 60 from the point in time at which switching element 61 is moved to the "closed" position. As a result, after switching element 61 is moved to the closed position, impulse circuit breaker 60 continues to be electrically "open" until the time delay of time delay mechanism 65 has expired. In this manner, the frequency of oscillation of base member 9 is varied by varying the time delay of time delay mechanism 65. As is shown in FIG. 3, a set screw 66 located on top of handle 3 may be rotated to turn a shaft 67 which connects the set screw 66 with time delay mechanism 65. By turning set screw 66, the duration of the time delay in time delay mechanism 65 can be selectively set. In this manner, by adjusting set screw 66 the time delay of circuit breaker 60 may be varied with a corresponding change in the frequency of oscillation of base member 9. Various types of time delay mechanisms may be utilized as time delay mechanism 65 and such devices are well known in the art.

In the alternative embodiment shown schematically in FIG. 5, an electronic pulsing unit 80 is substituted for circuit breaker 60 and switch elements 61–62. Pulsing unit 80 may be anyone of various conventional designs wherein a circuit, preferably with solid-state components, intermittently passes and interrupts the flow of current between power source 24 and coil 47. An example of such a circuit would be a standard RC timing circuit. Pulsing unit 80 may be imbedded in handle 3 at various locations. With the use of pulsing unit 80, the mechanical switch elements 61–62 and circuit breaker 60 are eliminated. Pulsing unit 80 contains a variable time-delay element 81 which may be set at the selected frequency of oscillation by turning a set screw 82 or similar device. With the use of pulsing unit 80, the activation and operation of rod 1 is similar to that used when circuit breaker 60 is utilized.

The operation of fishing rod 1 with circuit breaker 60 can be summarized as follows. The user of the fishing rod depresses thumb switch 48 when it is desired that a jigging oscillation be imparted to the extended rod 2. When thumb switch 48 is closed, current from power cells 24 contained within handle 3 is conducted to the normally closed impulse circuit breaker 60. Impulse circuit breaker 60 is kept in its normally closed position by means of biasing spring 36 which connects base member 9 to handle 3. The flow of current through circuit breaker 60 activates coil 47 to magnetize metallic armature 46. This magnetization of armature 46 repels permanent magnet 54 to repel the drive end 10 of base member 9. As the drive end 10 of base member 9 is moved downwardly, contact post 62 moves switching element 61 away from the terminals of circuit breaker 60 thus opening the circuit breaker. This terminates power to coil 47 and metallic armature 46 loses its magnetism and attracts magnet 53 toward it. As a result, the drive end 10 of base member 9 moves toward armature 46 again moving contact post 52 against switching element 61 which in turn closes the impulse circuit breaker 60. This repeats the magnet repelling - attraction cycle. The frequency of this cycle is varied by setting set screw 66 which varies the time delay in time delay mechanism 65. Time delay mechanism 65 in turn delays the effective closing of circuit breaker 60 in response to movement of switching element 61. As a result, an oscillating motion of extended rod 2 is established which is turned on and off by thumb switch 48, and whose frequency can be varied by turning set screw 66. This produces an electrically operated oscillating fishing rod which may be utilized for jig fishing. It should be noted that in mounting the oscillating apparatus, the present invention would also be carried out if the electromagnet and/or the circuit breaker were mounted on the rod, with the permanent magnet mounted on the handle. Similarly, when electronic pulsing unit 80 is utilized, the flow of current to magnetic coil 47 is also interrupted at a pre-selected rate. The resultant attraction and repulsion between armature 46 and permanent magnet 53 is as was described earlier for the embodiment with circuit breaker 60 present.

DESCRIPTION OF PRIMARY ALTERNATIVE EMBODIMENT

Referring to FIGS. 6–12, wherein like numerals refer to like structural elements, a primary alternative embodiment of the apparatus described earlier, designated by the numeral 101 in the FIGS., consists generally of an extended rod portion 102 which is attached to a handle 103 by means of a pivot pin 104. Oscillating apparatus 105, which will be described in detail later, operably interconnects rod 102 with handle 103 to provide an oscillating motion of rod 102 with respect to handle 103 which serves to jig a fishing line 108 which may be attached to rod 102.

As was described in the foregoing section referring to the first embodiment of this invention, and as is shown in FIGS. 6–12, in the primary alternative embodiment, the extended rod 102 includes a plurality of eyelets 107 for supporting the line 108. In addition, the front portion of the handle 103 carries a hook retainer element 144 into which the hook from line 108 may be inserted for safety and convenience.

A jigging motion consisting of an oscillating motion generally in the vertical plane of the handle 103 is imparted to rod 102 by means of oscillating apparatus 105 contained within handle 103. An element of oscillating apparatus 105 is a balance arm 109 shown in detail in FIGS. 8 and 12. Balance arm 109 has an S shape with a drive end 110 and an attachment end 111. Extended rod 102 has a base end 106 which is attached to the attachment end 111 by means of pole attachment means 112 which may consist of an attachable or a fixed attachment device. An attachable device would allow the rod 102 to be conveniently removed from balance arm 109 for purposes of stowage. Extended rod 102 is shown as an elongated straight rod, but may have other shapes also.

Handle 103 consists of an elongated body portion 116 attached to a mounting portion 121. Elongated body 116 has a contoured bottom surface with finger indentations 117 which facilitate handling of the rod. Handle 103 is generally held by wrapping the hand around elongated body 116. Contained within elongated body 116 is a recess 119 which, as in the earlier described embodiment, houses two power cells each designated here by the numeral 124. Handle recess 119 is accessible through an opening 120 in the back end of elongated body 116. A retention cap 122 may be threadably attached to elongated body 116, or may be attached in other means such as the snap-on embodiment shown on FIGS. 6–12. An engagement spring 125 attached to the interior surface of retention cap 122 acts to force the two power cells 124 into engagement with one another to provide two electrical cells in series.

Mounting portion 121 of handle 103 comprises a top member 129 which is attached to opposed side members 130. A front bulkhead 132 and an open-ended rear bulkhead 133 adjoin the ends of side members 130 to form an enclosed compartment 131 within mounting portion 121. Pivot pin retention means are provided which include a mounting opening carried by at least one of said side members 130 for receiving and supporting therein a pivot pin 104. Pivot pin 104 is intended to extent through an opening 135 in the attachment end 111 of balance arm 109. This allows balance arm 109 to pivot about pivot pin 104 at a point generally near the front bulkhead 132. Other means for pivotally mounting balance arm 109 within compartment 131 at a point generally near the attachment end 111 of the balance arm may also be utilized where appropriate.

Housed within compartment 131 is oscillating apparatus or means which is described generally by the numeral 105. Oscillating apparatus 105 includes a magnetic drive device 145 and an impulse circuit breaker 160. As is shown in detail in FIGS. 8 and 12, and in the electrical schematic shown in FIG. 11, magnetic drive device 145 includes an electromagnetic coil 147 which may be energized to form a magnetic field as is well known in the art. In the embodiment shown in FIG. 8, magnetic drive device 145 is attached to the bottom member 139 by means of a pedestal 140. Other means of mounting may also be utilized. In an alternative embodiment of primary embodiment 101, i.e. device 201 shown in FIG. 12, drive device 145 is attached such that it is located between balance arm 109 and top member 129 of handle 103. This is an alternative mounting configuration for balance arm 109.

Permanent magnet 153 is attached adjacent the drive end 110 of balance arm 109. It is intended that permanent magnet 153 be insertable within the center opening of coil 147. As power is intermittently applied and cut-off from coil 147, a magnetic field is established within the center of coil 147. With power supplied and cut-off to coil 147, the magnetic field is produced and eliminated intermittently. It is intended that permanent magnet 153 rest within the opening in coil 147. As a result, as the coil 147 is energized and de-energized by the supply of power to the coil, the magnetic field which is established is intermittent. The magnetic field serves to repel the permanent magnet 153 when energized, and the magnet is attracted to the coil when the coil is de-energized. This intermittent attraction and repulsion serves to move the drive end 110 of balance arm 109 about pivot pin 104, imparting an oscillating motion to the end of extended rod 102. This motion of extended rod 102 in turn causes a jigging motion in a fishing line 108 which may be carried by the extended rod 102.

To cause the drive end 110 of balance arm 109 to be cyclically moved away and toward coil 145 in such a way as to cause a continuously oscillating movement of balance arm 109, it is necessary that the power supplied to coil 147 be intermittently turned on and off. To cause this intermittent power supply from power cells 124, impulse circuit breaker 160 is utilized. As is shown in detail in FIG. 8, impulse circuit breaker 160 is attached to one of side walls 130 of handle 103.

Figure 11:
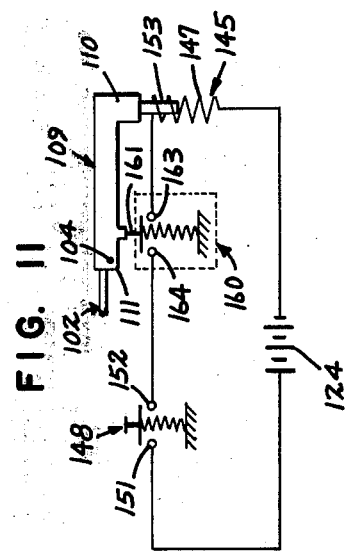
FIG. 11 is a schematic diagram of the oscillating apparatus of the primary alternative embodiment fishing rod apparatus.

Impulse circuit breaker 160 consists of a movable switching element 161 which is positioned in operable engagement with fixed electrical terminals 163 and 164 (see electrical schematic diagram in FIG. 11). As is typical in the art of circuit breakers, as switching element 161 makes contact between terminals 163 and 164, the circuit between the terminals is closed. When switching element 161 moves away from the terminals the circuit is open. In this embodiment, impulse circuit breaker 160 is in a normally closed position.

Connected in series with impulse breaker 160 is a thumb switch 148. As is shown in FIG. 7, thumb switch 148 is attached to the top portion of handle 103 in a position wherein the operator of the fishing rod 101 can activate switch 148 by motion of his thumb or finger. In this embodiment, thumb switch 148 consists of a housing which is attached to handle 103 and which contains a push button 149. Other suitable switches may be utilized where appropriate. The Applicant has found that is is particularly advantageous to utilize a thumb switch gasket 127 made of rubber or similar material which is sealed to the top member 129 of handle 103 and which overlays the movable element of thumb switch 148. This seals the interior compartment of handle 103 while still allowing the switch to be maneuvered by thumb force on the exterior of the handle.

As is shown schematically in FIG. 11, thumb switch 148, power cells 124, impulse circuit breaker 160 and magnetic drive device 145 are all connected in series. The purpose of such series connection can be described as follows. When thumb switch 148 is closed by the person utilizing the rod, power fom power cells 124 is conducted across terminals 151 and 152 of thumb switch 148 to circuit breaker 160. Since impulse circuit breaker 160 is normally open. When switching element 161 is in its extended position power is not transmitted to coil 147 of drive device 145. This absence of current in coil 147 allows permanent magnet 153 to be attracted to coil 147. This moves arm 109 downwardly which depresses switching element 161 to close circuit breaker 160. Thus, when power is supplied, the two magnetic fields repel one another forcing the drive end 110 of balance arm 109 upwardly away from coil 147. Because extended rod 102 is pivoted about pivot pin 104, the free end of elongated rod 102 moves in a downward direction.

When the drive end 110 of balance arm 109 is in a down position, i.e. when there is attraction between the coil and the permanent magnet (no power supplied to coil 147), the bottom edge of the attachment end 111 of balance arm 109 contacts movable switch 161 of circuit breaker 160. This will close the normally open circuit breaker 160 causing power to be transmitted to electrical coil 147. This energizes coil 147 to repel permanent magnet 153. This in turn moves the drive end 110 of balance arm 109 upwardly which urges the base end of attachment end 111 of balance arm 109 away from movable switch 161. As a result, impulse circuit breaker 160 returns to its normally open position cutting off power to coil 147. The process is then repeated in subsequent oscillations. As a result, balance arm 109 oscillates upwardly and downwardly about pivot pin 104 with a corresponding upward and downward movement of the end of extended rod 102. This causes a jigging motion of the end of the rod and a similar motion of any line which is attached thereto.

As is shown in detail in FIGS. 8–10, the primary alternative embodiment is provided with circuit breaker mounting means 170 which are utilized to selectively position impulse circuit breaker 160. Because of the S shaped design of balance arm 109, an inclined bottom surface is provided on attachment end 111. As balance arm 109 pivots about pivot pin 104, the vertical distance between the top edge of impulse circuit breaker 160 and the bottom edge of balance arm 109 will vary longitudinally along the attachment end 111. Thus, as is well known in the art of mechanical dynamics, the vertical amplitude of movement beneath attachment end 111 will vary depending upon the longitudinal position along that end. This feature is important with regard to the positioning of movable switch element 161 on circuit breaker 160. Depending upon which longitudinal position switch element 161 is positioned at, the time duration between successive outward and inward movements of switch element 161 will vary. Thus, by selectively positioning movable switch element 161, the frequency of oscillation of balance arm 109 and extended rod 102 may be varied and selected.

To provide means for selectively positioning circuit breaker 160 in a selected longitudinal position, circuit breaker mounting means 170 are utilized. These means consist of adjustment means 180 which are operably connected to circuit breaker 160 to selectively move it longitudinally. Adjustment means 180 comprise an adjustment knob 181 which protrudes outside of handle 103. In the embodiment shown in FIG. 8, adjustment knob 181 protrudes from the bottom of handle 103 and in the embodiment shown in FIG. 12, adjustment knob 181 protrudes out of the top of handle 103.

Referring to the embodiment shown in FIG. 8, attached to adjustment knob 181 is a lateral member 182. As adjustment knob 181 is rotated, lateral member 182 moves on an arcuate path around the pivot point of adjustment knob 181. Attached to the end of lateral member 182 is a rider element 184 protruding upwardly along an axis parallel to the pivot axis of adjustment knob 181. It is intended that rider element 184 ride in a guideway 171 provided in the mounting case of impulse circuit breaker 160. Guideway 171 is formed by two opposed rails having a guideway 171 between them. With rider element 184 constrained within guideway 171, as adjustment knob 181 is rotated, rider element 184 moves along an arcuate path bearing against the side members of guideway 171. This forceful engagement forces the circuit breaker 160 to move longitudinally in response to the rotational movement of adjustment knob 181. In this manner, rotational movement of adjustment knob 181 is translated into longitudinal movement of circuit breaker 160 in a direction between front bulkhead 132 and rear bulkhead 133 of handle 103. Thus, as the fisherman desires to vary the amplitude/frequency of oscillation of rod 102, he moves adjustment knob 181 until he has achieved the correct frequency and amplitude of movement of the rod. The direction of movement of circuit breaker 160 provided by mounting means 170 is indicated by the numeral 183 in FIG. 8.

Also provided in this primary alternative embodiment are circuit breaker setting means 177. Setting means 177 are intended to provide means for vertically positioning circuit breaker 160 when the oscillating apparatus 105 is initially "tuned" for use. Thus, in addition to providing longitudinal movement of circuit breaker 160 by mounting means 170, vertical movement of circuit breaker 160 is provided by setting means 177. Setting means 177 consist of a wheel 175 which operably protrudes through one of the side members 130 and which contains a slot for selective rotational movement and setting using a screwdriver-like tool. This mechanism is shown in detail in FIGS. 8, 9 and 10. Attached at a periphery point on wheel 175 is a peg element 178. Peg element 178 extends along an axis generally parallel to the axis of rotation of wheel 175. Peg element 178 is intended to ride within a guide channel 179 formed on the side of the case of circuit breaker 160. Because peg 178 is off center from the rotational axis of wheel 175, as wheel 175 is rotated peg 178 rotates on a larger diameter and bears against the side walls forming guide channel 179. This bearing force tends to move circuit breaker 160 upward or downward depending on the direction of movement of wheel 177. This motion in turn pre-sets the position of movable switch element 161 in proper engagement with balance arm 109. Such positioning may be necessary when the rod is initially used since the parts may not be truely alined after factory production. This movement may also be utilized to properly set switch element 161 after circuit breaker 160 has been moved longitudinally by circuit breaker mounting means 170.

After the vertical positioning has been made by turning wheel 175 using a screwdriver slot on the exterior of handle 103, the vertical positioning of circuit breaker 160 remains fixed.

In order to seal handle 103 from the admission of water, dirt or other contaminates, the thumb switch gasket 127 which has been described earlier is utilized. In addition, a gasket is placed on the interior surface of retention cap 122 which would bear against the edge surrounding opening 120 to prevent leakage. also, a bulkhead gasket 118 is utilized to cover the opening in front bulkhead 132 through which rod base end 106 protrudes. Bulkhead gasket 118 has an opening in it which tightly fits around rod base end 106 thereby preventing the leakage of moisture past rod base end 106 into interior compartment 131.

Various means 136 may be utilized to mount line storage reel 115 on handle 103. One particular embodiment is shown in FIG. 9 where a cap element has a screw protruding through it which screws into a portion of handle 103. Other suitable mounting means may also be utilized.

The operation of fishing rod 101 is similar to that described for fishing rod 1 earlier in the specification. It should be noted that an alternative embodiment showing a different positioning for balance arm 109 is shown in FIG. 12. In this embodiment, a circuit breaker 260, similar to circuit breaker 160, is positioned above S-shaped balance arm 209 which is similar to balance arm 109. Adjustment means 180 are provided between balance arm 209 and top member 129 of rod 201. In this embodiment, electrical coil 147 is positioned above balance arm 209 between the balance arm and top member 129 of handle 103. The operation of this embodiment is similar to that described earlier with the exception of the positioning of balance arm 209 with regard to circuit breaker 260 and coil 147.

Of importance to the operation of the primary alternative embodiment is the fact that balance arm 109 is specially balanced in relation to extended rod 102 such that when a fish pulls on the ends of rod 102, this pulling motion is sufficient to overcome the weight of balance arm 109 and the power exerted on permanent magnet 153 by coil 145 so as to prevent the next cycle of movement of the drive end of balance arm 109. As a result, the pulling motion on the rod arrests the motion of the rod and no further oscillation takes place. This allows the rod to then be used in a conventional manner to set the bait in the fish's mouth and to extract from the water. This capability includes means which balance the rod and the balance arm in combination with the pivot pin 104 being located at the attachment end 111 as specified. If this balancing of weights and this positioning of the pivot were not present, the rod would not necessarily stop jigging when there is a pull on the end. It should be noted that the stopping of jigging is the signal to the fisherman that a strike has been made on the line. This eliminates the need for a cork or bobber used in conjunction with the line. Thus, when a fish strikes the line, because of the positioning and weighting of the balance arm 109 and the extended rod 102, the oscillation stops which indicates both by feel and by sight that a strike has been made on the line. This balancing and positioning of the balance arm 109 and the extended rod 102 are referred to herein as "oscillation balance means". This balancing and positioning of these components has the further advantage that it provides sufficient time delay between successive oscillations to provide sufficient rod movement. One element contributing to this factor is the S-shape of balance arm 109, and its size and weight relative to rod 102.

What is claimed is:

1. Fishing rod apparatus useful for jig fishing, comprising:
   a. an elongated pole having a base end, and a free end to which may be attached a fishing line;
   b. a handle having an interior compartment;
   c. a base member located generally within said handle interior compartment and having a first end attached to the base end of said elongated rod, and a second end;
   d. a pivot pin interconnecting said base member and said handle to allow pivotal motion of said base member thereabout, said pivot pin being located generally adjacent said base member first end;
   e. switching means attached to said handle and selectively movable between an on and an off position for selectively turning on and off power from a power source;
   f. electrical oscillating means operably attached between said base member and said handle for producing an oscillating movement in the free end of said elongated pole, said oscillating means being attachable to a power source and including:
      i. an electromagnetic coil attached to said handle, said electromagnetic coil being energized only when power is supplied to it;
      ii. a permanent magnet attached to said base member generally near the base member second end and being positioned generally adjacent said electromagnetic coil, said permanent magnet serving to repel and attract said base member second end toward and away from said electromagnetic coil when power is intermittently supplied to the electromagnetic coil;
      iii. an impulse circuit breaker attached to said handle and having a switching element for intermittently controlling a supply of power to said electromagnetic coil as said switching element is activated, said switching element operably engaging said base member intermittently as the base member pivots toward and away from said switching element;
      iv. electrical circuit means interconnecting said electromagnetic coil, said impulse circuit breaker and said switching means to provide intermittent power from a power source to said electromagnetic coil when said switching means are turned on; and
   g. line storage means for storing fishing line generally adjacent said handle.

2. The fishing rod apparatus of claim 1 wherein said electrical oscillating means further include variable control means for selectively regulating the frequency of power interruption produced by the interaction of said switching element and said base member.

3. Fishing rod apparatus useful for jig fishing, comprising:
   a. an extended rod having a base end and a free end to which may be attached a fishing line;
   b. a handle having an interior compartment;
   c. a balance arm located generally within said handle interior compartment and having an attachment end and a drive end;
   d. attachment means for attaching the base end of said extended rod to the attachment rod of said balance arm;
   e. a pivot pin interconnecting the attachment end of said balance arm and at least a portion of said handle about which said balance arm and said extended rod may rotate;
   f. switching means attached to said handle and being selectively movable between an on and off position for selectively turning on and off power from a power source;
   g. electrical oscillating means operably attached between said balance arm and said handle for producing an oscillating movement in the free end of said extended rod, said oscillating means being attachable to a power source and including:
      i. an electromagnetic coil supported by said handle, said electromagnetic coil being energized only when power is supplied to it;
      ii. a permanent magnet attached to the drive end of said balance arm and being positioned generally adjacent said electromagnetic coil, said permanent magnet serving to repel and attract said balance arm drive end toward and away from said electromagnet coil when power is intermittently supplied to the electromagnetic coil;
      iii. an impulse circuit breaker attached to said handle and having a switching element for intermittently controlling a supply of power to said electromagnetic coil as said switching element is activated, said switching element operably engaging said balance arm intermittently as the balance arm pivots toward and away from said switching element;
      iv. electrical circuit means interconnecting said electromagnetic coil, said impulse circuit breaker and said switching means to provide intermittent power from a power source to said electromagnetic coil when said switching means are turned on; and
   h. circuit breaker mounting means for movably mounting said circuit breaker to said handle such that said circuit breaker can be selectively positioned in a plurality of positions along at least a portion of the length of said balance arm attachment end.

4. The fishing rod apparatus of claim 3 wherein said circuit breaker mounting means include:
   a. a guideway attached to said circuit breaker;
   b. an adjustment knob rotatable from outside of said handle;
   c. a rider element operably attached to said adjustment knob for movement in said guideway in response to movement of said adjustment knob, said movement of said rider element in said guideway causing said circuit breaker to move along a direction between the attachment end and drive end of said balance arm.

5. The fishing rod apparatus of claim 4 and further including:
   a. circuit breaker setting means for selectively moving said circuit breaker along a direction between said adjustment knob and said balance arm to selectively position said circuit breaker.

6. The fishing rod apparatus of claim 3 including oscillation balance means for properly balancing said balance arm and said extended rod such that the oscillation of said balance arm ceases when pressure is applied to said extended arm.

* * * * *